United States Patent
Mengerink et al.

(10) Patent No.: US 9,235,315 B2
(45) Date of Patent: *Jan. 12, 2016

(54) METHOD AND SYSTEM TO DISPLAY A POP-UP WINDOW WHEN A USER LEAVES A WEBSITE

(71) Applicant: eBay Inc., San Jose, CA (US)

(72) Inventors: Matthew Mengerink, San Jose, CA (US); Justin Christopher Early, Portland, OR (US); Jeremy A. Davis, San Jose, CA (US)

(73) Assignee: eBay Inc., San Jose, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/857,906

(22) Filed: Apr. 5, 2013

(65) Prior Publication Data

US 2013/0227475 A1    Aug. 29, 2013

Related U.S. Application Data

(63) Continuation of application No. 10/837,137, filed on Apr. 30, 2004, now Pat. No. 8,418,078.

(51) Int. Cl.
*G06F 3/048*    (2013.01)
*G06F 3/0481*   (2013.01)
*G06F 9/44*     (2006.01)

(52) U.S. Cl.
CPC ............ *G06F 3/0481* (2013.01); *G06F 9/4443* (2013.01)

(58) Field of Classification Search
CPC .................................................... G06F 3/0481
USPC ......................................................... 715/808
See application file for complete search history.

(56) References Cited

U.S. PATENT DOCUMENTS

| | | |
|---|---|---|
| 5,297,286 A | 3/1994 | Uehara |
| 6,011,537 A | 1/2000 | Slotznick |
| 6,968,507 B2 | 11/2005 | Pennell et al. |

(Continued)

OTHER PUBLICATIONS

"U.S. Appl. No. 10/837,137, Advisory Action mailed Oct. 14, 2010", 3 pgs.

(Continued)

*Primary Examiner* — Matthew Ell
(74) *Attorney, Agent, or Firm* — Schwegman Lundberg & Woessner, P.A.

(57) ABSTRACT

A method and system to display a pop-up window when a user leaves a website are disclosed. A user accesses a website with a web browser. When a web page from the website is loaded into the user's browser, a client-side variable is set to a particular value, such as the current time. When the web page from the website is unloaded from the browser, a hidden pop-up window is loaded. The hidden pop-up window is programmed to sleep and then check the value of the client-side variable. A change in the value of the client-side variable indicates a new web page from the same web server has been loaded into the web browser and the user has not left the website. However, if a web page from a different web server is loaded into the browser, then the value of the client-side variable remains unchanged. Consequently, when the hidden pop-up window awakes and checks the value of the client-side variable, the pop-up window can determine whether the user has left the original website. If the user has left the original website, the pop-up window is displayed. If not, the pop-up window is unloaded before ever being displayed to the user.

20 Claims, 7 Drawing Sheets

(56) References Cited

U.S. PATENT DOCUMENTS

| | | |
|---|---|---|
| 7,162,739 B2 | 1/2007 | Cowden et al. |
| 8,418,078 B2 | 4/2013 | Mengerink et al. |
| 2003/0009372 A1 | 1/2003 | Nyhan et al. |
| 2003/0131052 A1 | 7/2003 | Allan |
| 2003/0187952 A1 | 10/2003 | Young et al. |
| 2004/0125149 A1 | 7/2004 | Lapidous |
| 2004/0148307 A1 | 7/2004 | Rempell |
| 2005/0066290 A1 | 3/2005 | Chebolu et al. |
| 2006/0190831 A1* | 8/2006 | Kelso et al. .................. 715/764 |
| 2007/0038956 A1 | 2/2007 | Morris |

OTHER PUBLICATIONS

"U.S. Appl. No. 10/837,137, Appeal Brief filed Oct. 10, 2011", 21 pgs.

"U.S. Appl. No. 10/837,137, Decision on Pre-Appeal Brief Request mailed Nov. 24, 2010", 2 pgs.

"U.S. Appl. No. 10/837,137, Final Office Action mailed Jul. 12, 2010", 11 pgs.

"U.S. Appl. No. 10/837,137, Final Office Action mailed Aug. 10, 2011", 16 pgs.

"U.S. Appl. No. 10/837,137, Final Office Action mailed Sep. 16, 2009", 14 pgs.

"U.S. Appl. No. 10/837,137, Final Office Action mailed Sep. 25, 2007", 12 pgs.

"U.S. Appl. No. 10/837,137, Final Office Action mailed Nov. 14, 2008", 13 pgs.

"U.S. Appl. No. 10/837,137, Non Final Office Action Feb. 7, 2011", 13 pgs.

"U.S. Appl. No. 10/837,137, Non Final Office Action mailed Mar. 9, 2009", 16 pgs.

"U.S. Appl. No. 10/837,137, Non Final Office Action mailed Apr. 16, 2007", 11 pgs.

"U.S. Appl. No. 10/837,137, Non-Final Office Action mailed May 2, 2008", 13 pgs.

"U.S. Appl. No. 10/837,137, Non-Final Office Action mailed Dec. 21, 2009.", 14 pgs.

"U.S. Appl. No. 10/837,137, Notice of Allowance mailed Dec. 7, 2012", 14 pgs.

"U.S. Appl. No. 10/837,137, Pre-Appeal Brief Request filed Nov. 1, 2010", 5 pgs.

"U.S. Appl. No. 10/837,137, Response filed Feb. 17, 2009 to Final Office Action mailed Nov. 14, 2008", 18 pgs.

"U.S. Appl. No. 10/837,137, Response filed Mar. 19, 2008 to Final Office Action mailed Sep. 25, 2007", 18 pgs.

"U.S. Appl. No. 10/837,137, Response filed Mar. 22, 2010 to Non Final Office Action mailed Dec. 21, 2009", 18 pgs.

"U.S. Appl. No. 10/837,137, Response filed May 6, 2011 to Non Final Office Action mailed Feb. 7, 2011", 17 pgs.

"U.S. Appl. No. 10/837,137, Response filed Jun. 9, 2009 to Non Final Office Action mailed Mar. 9, 2009", 20 pgs.

"U.S. Appl. No. 10/837,137, Response filed Jun. 21, 2007 to Non Final Office Action mailed Apr. 16, 2007", 7 pgs.

"U.S. Appl. No. 10/837,137, Response filed Aug. 4, 2008 to Non-Final Office Action mailed May 2, 2008", 18 pgs.

"U.S. Appl. No. 10/837,137, Response filed Sep. 10, 2010 to Final Office Action mailed Jul. 12, 2010", 18 pgs.

"U.S. Appl. No. 10/837,137, Response filed Nov. 13, 2009 to Final Office Action mailed Sep. 16, 2009", 16 pgs.

* cited by examiner

METHOD AND SYSTEM TO DISPLAY A POP-UP WINDOW WHEN A USER LEAVES A WEBSITE

RELATED APPLICATIONS

This patent application is a continuation that claims the benefit of priority, to U.S. patent application Ser. No. 10/837,137 filed on Apr. 30, 2004, which is incorporated herein by reference in its entirety.

FIELD OF THE INVENTION

The present invention relates generally to the field of graphical user interfaces for computing, and more particularly to a method and system to display a pop-up window when a user leaves a particular website

BACKGROUND OF THE INVENTION

Online retailers have come up with many clever methods to advertise their goods and services on the World Wide Web via the Internet. One such scheme is referred to as a pop-up window. A pop-up window, sometimes referred to as a pop-up advertisement, is a window that suddenly appears (pops up) when a user takes a particular action, such as when a user selects a link with a mouse click or presses a special function key on a keyboard. Generally, pop-up windows are one of two types. A pop-up advertisement is a window that appears on top of the active window, thereby disrupting the user by blocking the view of the active window. A pop-under advertisement is a pop-up window that appears underneath the active window so that it does not disturb the user.

While pop-up windows are primarily used for advertising, there are a variety of other uses for pop-up windows. For example, an online retailer might use a pop-up window to present a survey, or otherwise solicit information, from the user.

SUMMARY OF THE INVENTION

In accordance with one aspect of the present invention, there is provided a method and system to display a pop-up window when a user leaves a website. Accordingly, a client-side variable is set with a particular value each time a user interacts in a particular manner with a particular website. In addition, a pop-up window is loaded, but not displayed. The pop-up window is programmed to sleep for a predetermined length of time, and then, wake up and check the value of the client-side variable. If the value of the client side variable has not changed while the pop-window was sleeping, then the pop-up window is displayed.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 3 and 4 illustrate timing and event diagrams for one embodiment of a method to display a pop-up window when a user leaves a website.

DETAILED DESCRIPTION

A method and system to display a pop-up window when a user leaves a website are described. In the following description, for purposes of explanation, numerous specific details are set forth in order to provide a thorough understanding of the present invention. It will be evident, however, to one skilled in the art that the present invention may be practiced without these specific details.

Figure 1:
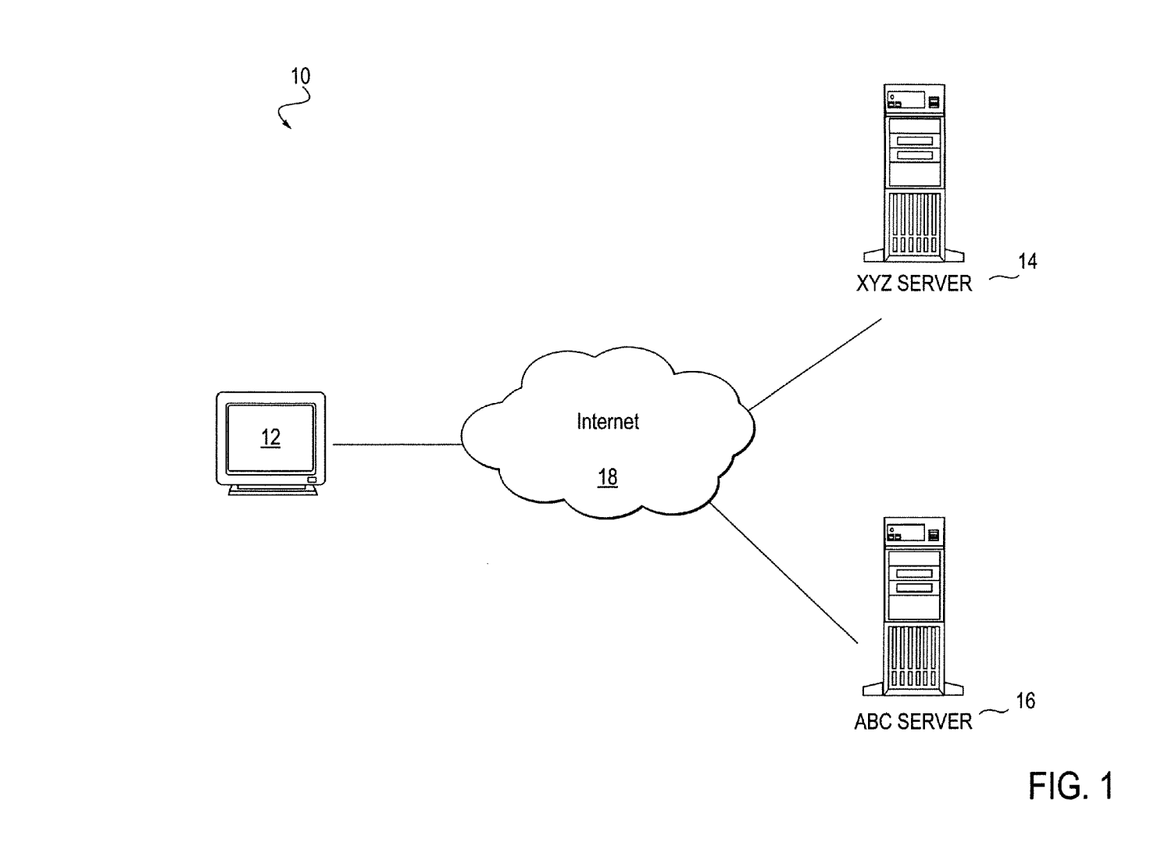
FIG. 1 illustrates an exemplary client-server network environment in which the present invention might be implemented.

FIG. 1 illustrates an exemplary client-server network environment 10 in which the present invention might be implemented. The client-server network environment 10 includes a client PC 12, coupled to two different servers, a server XYZ 14 and a server ABC 16, via the Internet 18. The server XYZ 14 executes server software including, but not limited to, web server software to host a website with a World Wide Web domain name of www.xyz.com. Similarly, the server ABC 16 executes server software including, but not limited to, web server software to host a website with a World Wide Web domain name of www.abc.com. A user of the client PC 12 utilizes a web browser application executing on the client PC 12 to access server documents (e.g., web pages) stored on the server XYZ 14 and the server ABC 16.

In accordance with an embodiment of the present invention, a user browsing web pages from one website, for example the XYZ web site hosted on the server XYZ 14, will be presented with a pop-up window if the user leaves the XYZ web site. For example, if the user selects a link to the ABC web site, hosted on the server ABC 14, a pop-up window will be displayed to the user. The pop-up window might serve one of any number of purposes, including presenting the user with a survey, and in particular, inquiring of the user the reason for leaving the XYZ web site.

Figure 2:
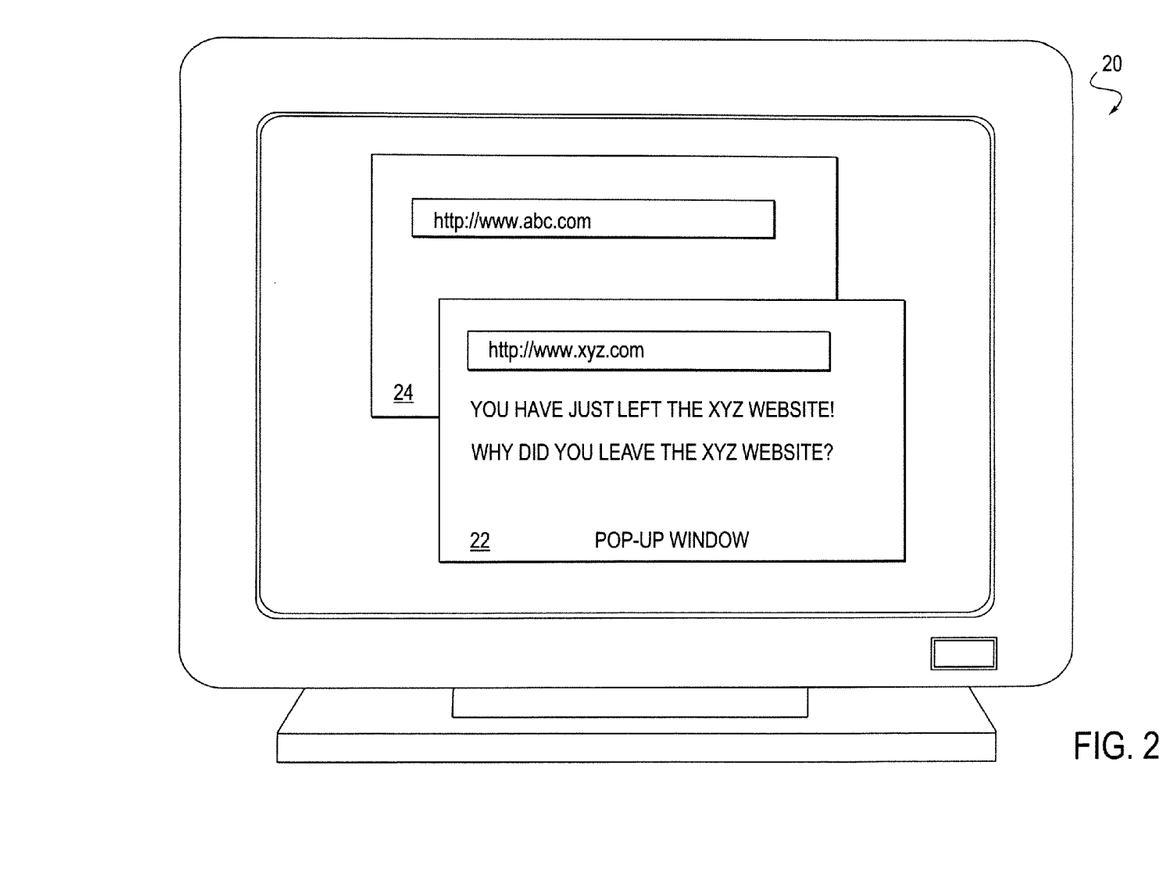
FIG. 2 illustrates a computer display screen displaying an exemplary pop-up window.

FIG. 2 illustrates a computer display screen 20 displaying a pop-up window 22 in a type of graphical user interface referred to as a windowing system. The present invention is independent of any particular type of windowing system and may be implemented to work with any operating system utilizing a windowing system, including the well known Microsoft Windows® operating system. For one embodiment of the invention, the windowing system allows individual programs to be separately executed and displayed in individual windows on the display screen 20. For example, as illustrated in FIG. 2, a web browser program is executing in the background window 24 and in the pop-up window 22.

For one embodiment of the present invention, a user browses a website by entering a uniform resource locator (URL) (e.g., http://www.xyz.com) into the address bar of the web browser program executing in the window 14. The user can also navigate by selecting different internal and external links on the individual web pages of the XYZ website. An internal link is a link to another web page on the XYZ website, or another location on the same web page of the XYZ website. An external link is a link to a web page of another website, for example, the ABC website (e.g., http://www.abc.com). In addition, most web browser programs have "back" and "forward" buttons that allow the user to navigate back and forth between previously loaded web pages.

For one embodiment of the present invention, so long as the user stays on the XYZ website by selecting internal links to the XYZ website, or entering URL addresses of the XYZ website, no pop-up window 22 will be displayed. However, when the user selects an external link, or enters a URL address external to the XYZ website, a pop-up window 22 is displayed. In addition, if the user closes the web browser all together, a pop-up window will be displayed. One advantage of the present invention is that the developer is given control over exactly when a pop-up window is displayed and pop-up windows are not indiscriminately displayed during the user's web browsing session.

Figure 3:
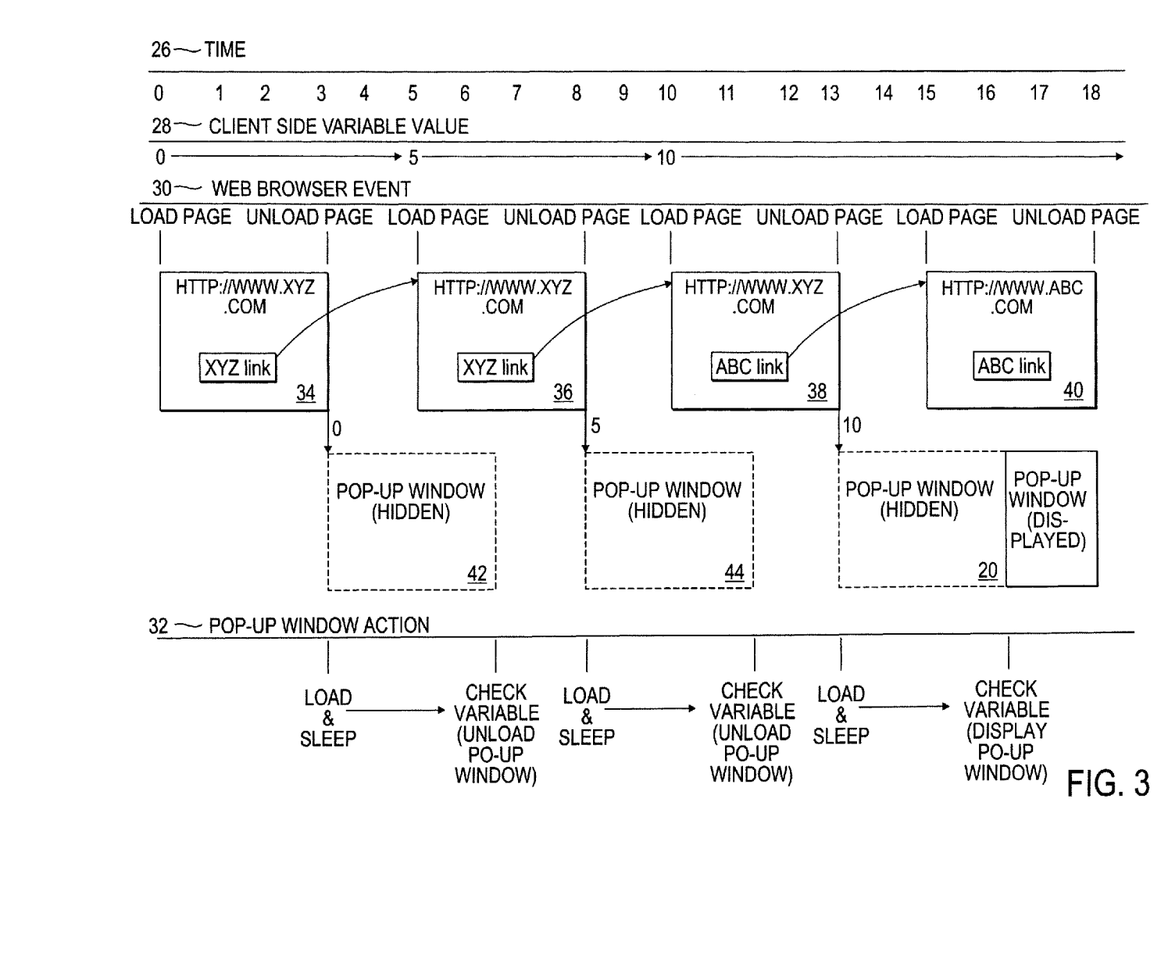

FIG. 3 illustrates a timing and event diagram for one embodiment of a method to display a pop-up window when a user leaves a website. In FIG. 3, the horizontal timeline 26 stretching across the top of the figure represents time and is used to illustrate the relationship between different events with respect to time. For example, it can be seen from FIG. 3 that at time 0, a web browser event occurs (e.g., load page) and the value of the client-side variable is set to 0. For purposes of describing the invention, it will be appreciated that the particular units used to measure time are unimportant, and therefore not given.

The horizontal line labeled "CLIENT-SIDE VARIABLE VALUE" 28 stretching horizontally across the figure illustrates the value of the client-side variable over time. For example, it can be seen from FIG. 3, that the value of the client-side variable is originally set to 0 at time 0 and then the value is changed to 5 at time 5. Similarly, the horizontal line labeled "WEB BROWSER EVENT" 30 represents an event timeline for web browser events. The horizontal line labeled "POP-UP WINDOW EVENT" 32 illustrates the pop-up window events associated with the pop-up windows 42, 44, and 46. For example, from FIG. 3, it can be seen that hidden pop-up window 42 is loaded at time 3 and sleeps from the time it is loaded until time 6, when it checks the value of the client-side variable and is unloaded.

For one embodiment of the present invention, a user enters a URL, for example, http://www.xyz.com, into the address bar of a web browser executing in a window 24 on the display screen 20. Accordingly, at time 0, a web page 34 from the XYZ website is loaded into the web browser. When the web page 34 is loaded at time 0, a client-side variable is also set to a particular value. For one embodiment of the invention, and as illustrated in FIG. 3, the variable is set to a value corresponding to the current time. For example, at time 0, the value of the variable is set to 0.

Next, when the user selects the internal XYZ link on the web page 34, the web browser requests a new web page 36 from the web server hosting the XYZ website. Accordingly, at time 3, the web browser unloads the original web page 34 and, at the same time, the windowing system loads a hidden pop-up window as indicated by the dotted-line box with reference number 42. The hidden pop-up window 42 is not displayed to the user and is programmed to immediately sleep for a predetermined amount of time. As illustrated in FIG. 3, the hidden pop-up window 42 sleeps until time 6. However, at time 5, the web browser executing in window 24 completes the loading of the new web page 36. When the XYZ web server 14 serves the new web page 36, the client-side variable is also set to the current time when the new web page 36 is loaded. Consequently, at time 5, the value of the client-side variable is set to 5.

At time 6, when the pop-up window 42 awakes and checks the value of the client-side variable, the pop-up window determines that the value of the client-side variable has changed from 0 to 5. For one embodiment of the present invention, the pop-up window 42 is programmed to exit, or unload, if the value of the client-side variable has changed since the time when the pop-up window was originally loaded. For one embodiment of the present invention, when the pop-up window is initially created, the current value of the client-side variable is passed into the pop-up window. As illustrated in FIG. 3, when the pop-up window checks the value of the client-side variable at time 6, the pop-up window determines that the value of the client-side variable has changed from 0 to 5 and consequently, the pop-up window 34 is unloaded and never displayed to the user.

When the user selects the internal XYZ link on web page 36, the web browser executing in window 24 requests a new web page 38 from the web server hosting the XYZ website. Accordingly, at time 8, the web browser unloads the current web page 36 and the windowing system once again loads a hidden pop-up window 44. Again, the pop-up window 44 is programmed to sleep for a predetermined amount of time. For example, as illustrated in FIG. 3, the pop-up window 44 is programmed to sleep for three units of time, until time 11, before checking the value of the client-side variable. At time 10, the web browser completes the loading of the new web page 38 served by the web server 14 hosting the XYZ website. At time 10, when the new web page 30 is loaded, the client-side variable is also set to 10, the current time. Then, at time 11, the pop-up window 44 checks the value of the client-side variable and determines the value to be 10. Because the value of the client-side variable was changed from 5 to 10 when the new web page 38 was loaded, indicating that the new web page 38 was from the XYZ web server, the pop-up window 44 unloads before ever being displayed to the user.

When the user selects the external ABC link on web page 38, the web browser executing in window 24 requests a new web page 40 from the web server 16 hosting the ABC website. Accordingly, at time 13, the web browser unloads the current web page 38 and the windowing system once again loads a hidden pop-up window 20. The hidden pop-up window 20 is programmed to sleep for a predetermined amount of time before checking the value of the client-side variable. At time 15, the web browser completes loading of the new web page 40 served by the server 16 hosting the ABC website. However, because the new web page 40 is from the ABC web server, and not the XYZ web server, the value of the client-side variable is not changed, but instead, the value of the client-side variable remains 10. For one embodiment of the invention, only the XYZ web server, or a web server designated by the XYZ web server, can access (e.g., read or write) the client-side variable. Therefore, at time 16, when the hidden pop-up window 20 awakes and checks the value of the client-side variable, it determines that the client-side variable has not changed from the time the hidden pop-up window 20 was loaded. Consequently, the pop-up window 20 is displayed to the user at time 16.

In the example given with reference to FIG. 3, the pop-up window makes a comparison of the value of the client-side variable at the time the pop-up window is generated with the value of the client-side variable when the pop-up window wakes up. However, in an alternative embodiment, the pop-up window is programmed to compare the actual time that the pop-up window was created with the value of the client-side variable when the pop-up window wakes up. For example, at time 3 when the pop-up window 42 is loaded, the pop-up window checks the time and stores it to compare it with the client-side variable when the pop-up window awakes. Therefore, at time 3, the pop-up window would store the value 3. Consequently, at time 6 when the pop-up window checks the time stored in the client-side variable, it will determine that the time is later than the time when the pop-up window 42 was originally loaded because the client-side variable was changed from 1 to 5 when web page 36 was loaded into the web browser.

For one embodiment of the present invention, the client-side variable is an Internet cookie and the XYZ web server 14 hosting the XYZ website specifies a range of URLs for which the client-side variable is valid and accessible. For example, when the XYZ web server initially creates the cookie, the XYZ web server can specify what other web servers can access the cookie. A web server that can access the cookie can change the value of the cookie when it serves a web page to the web browser. Consequently, the pop-up window will determine that the value of the cookie has changed and unload before becoming visible to the user. While an Internet cookie is one example of a client-side variable, it will be appreciated that alternative embodiments might utilize mechanisms other than Internet cookies as a client-side variable. For example, a file or a database on the client could be used in place of an Internet cookie.

For one embodiment of the present invention, JavaScript® event handlers are used to take a particular action when a web browser event or window event occurs, such as a web page being loaded or unloaded. For example, the JavaScript® "on Load" event handler can be used to set the value of the client-side variable when a web page is loaded. Similarly, the JavaScript "on Unload" event handler can be used to generate a hidden pop-up window when a web page is unloaded.

Figure 4:
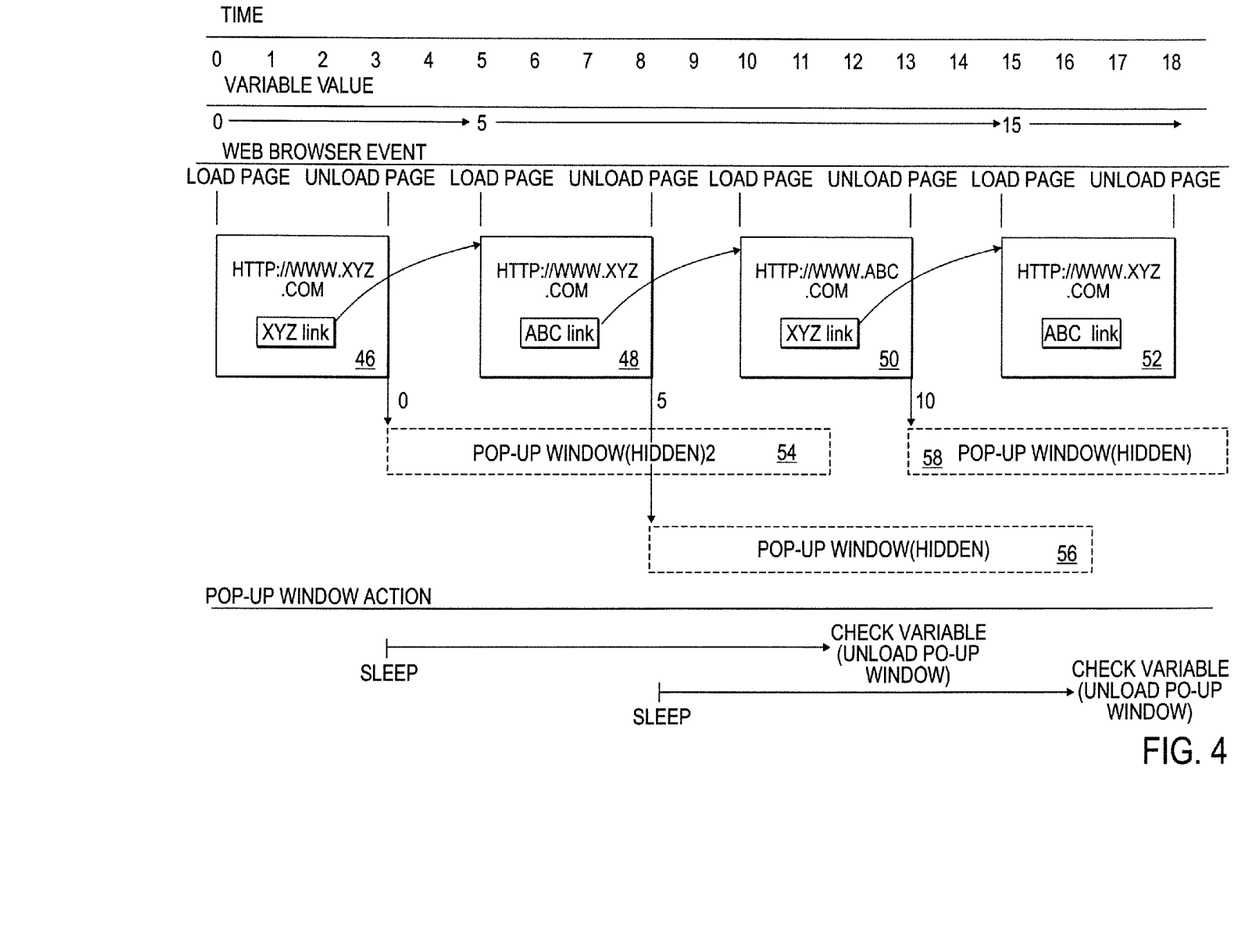
FIG. 4 illustrates a timing and event diagram for an alternative embodiment of a method to display a pop-up window when a user leaves a website.

One advantage of the present invention is the increased flexibility and control over the timing of the pop-up window. As illustrated in FIG. 4, by manipulating the length of time a pop-up window sleeps before checking the value of the client-side variable, a web-site developer can control when a pop-up window is displayed to a user. For example, a website developer can increase the pop-up window sleep time so that the pop-up window checks the value of the client-side variable after the user has left the website and then returned to the website. In such case, because the user has returned to the website, no pop-up window is displayed.

FIG. 4 illustrates a timing and event diagram for one embodiment of a method to display a pop-up window when a user leaves a website. FIG. 4 is very similar to FIG. 3, however, FIG. 4 illustrates the effect of increasing the sleep time of the pop-up window. For example, as illustrated in FIG. 4, by increasing the sleep time of the pop-up window a user is provided with more time to return to the initial website before a pop-up window is displayed.

As illustrated in FIG. 4, for one embodiment of the present invention, a user enters a URL, for example, http://www.xyz.com, into the address bar of a web browser executing in a window 24 on the display screen 20. Accordingly, at time 0, a web page 46 from the XYZ website is loaded into the web browser. When the web page 46 is loaded at time 0, a client-side variable is also set to a particular value. For one embodiment of the invention, and as illustrated in FIG. 4, the variable is set to a value corresponding to the current time. For example, at time 0, the value of the variable is set to 0.

Next, when the user selects the internal XYZ link on the web page 46, the web browser requests a new web page 48 from the web server 14 hosting the XYZ website. Accordingly, at time 3, the web browser unloads the original web page 46 and, at the same time, the windowing system loads a hidden pop-up window as indicated by the dotted-line box with reference number 54. The hidden pop-up window 54 is hidden and not displayed to the user, and is programmed to immediately sleep for a predetermined amount of time. In contrast to the example presented in FIG. 3, the sleep time is eight units of time for the example illustrated in FIG. 4. As illustrated in FIG. 4, the hidden pop-up window 54 sleeps until time 11.

At time 5, the web browser executing in window 24 completes the loading of the new web page 48. When the XYZ web server serves the new web page 48, the client-side variable is also set to the current time when the new web page 48 is loaded. Consequently, at time 5, the value of the client-side variable is set to 5.

When the user selects the external ABC link on web page 48, the web browser executing in window 24 requests a new web page 50 from the web server 16 hosting the ABC website. Accordingly, at time 8, the web browser unloads the current web page 48 and the windowing system once again loads a hidden pop-up window 56. Again, the pop-up window 56 is programmed to sleep for a predetermined amount of time. For example, as illustrated in FIG. 4, the pop-up window 56 is programmed to sleep for eight units of time, until time 16, before checking the value of the client-side variable. From time 8 until time 11, two hidden pop-up windows are executing in the background of the window-based operating system.

At time 10, the web browser completes the loading of the new web page 50 served by the web server 16 hosting the ABC website. At time 10, when the new web page 50 is loaded, the client-side variable is not changed. Because the ABC server 16 cannot access the client-side variable, the value of the client-side variable does not change when the ABC web page 50 is loaded. Then, at time 11, the pop-up window 44 checks the value of the client-side variable and determines the value to be 5. Because the value of the client-side variable was changed from 0 to 5 when the second XYZ web page 48 was loaded, indicating that the second web page 38 was from the XYZ web server 16, the pop-up window 44 unloads before ever being displayed to the user.

When the user selects the external XYZ link on web page 50, the web browser executing in window 24 requests a new web page 52 from the web server 14 hosting the XYZ website. Accordingly, at time 13, the web browser unloads the current web page 50 and the windowing system once again loads a hidden pop-up window 58. The hidden pop-up window 58 is programmed to sleep for a predetermined amount of time before checking the value of the client-side variable. At time 15, the web browser completes loading of the new web page 52 served by the server 14 hosting the XYZ website. Because the new web page 52 is from the XYZ web server, the value of the client-side variable is changed from 5 to the current time 15. At time 16, the pop-up window 56 loaded at time 8 wakes up and checks the value of the client-side variable. Because the value changed from 5 to 15 at time 15, the hidden pop-up window is unloaded before ever being displayed to the user. Consequently, despite the user navigating away from the XYZ website by selecting the ABC link to the ABC web page 50, the pop-up window 56 is not displayed to the user because the user returned to the XYZ website before the pop-up window checked the value of the client-side variable.

Figure 5:
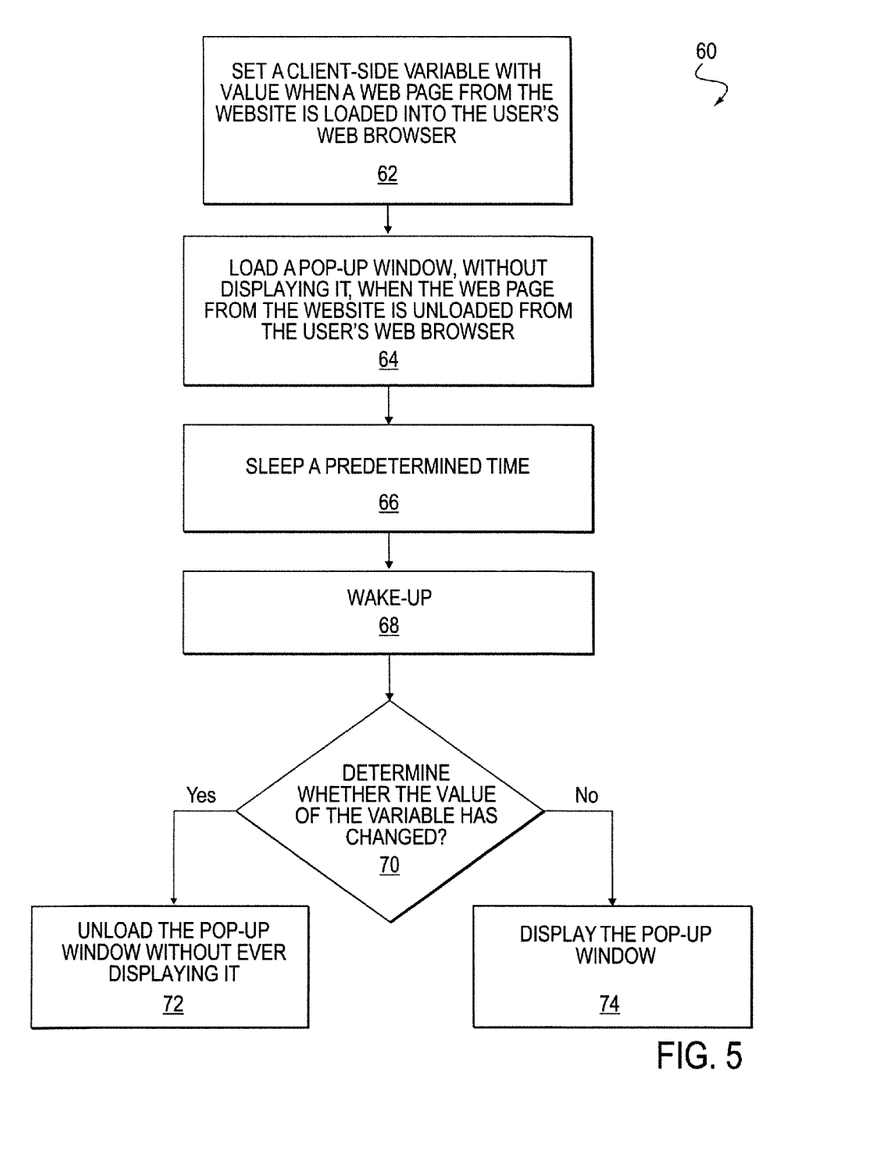
FIG. 5 illustrates a flowchart diagram, consistent with one embodiment of the present invention, for a method to display a pop-up window when a user leaves a website.

FIG. 5 illustrates a flowchart illustrating a method 60, according to an exemplary embodiment of the present invention, to display a pop-up window when a user leaves a website. At operation 62, a web page from particular website is loaded into a user's web browser and a client-side variable is set with a specific value.

Next, the user requests a new web page and, at operation 64, the previously loaded web page is unloaded from the user's web browser and a hidden pop-up window is loaded by the windowing system. The hidden pop-up window sleeps for a predetermined amount of time at operation 66. At operation 68, the sleeping, hidden window awakes.

Next, at operation 70, the hidden pop-up window determines whether the value of the client-side variable has changed. If the value has changed, indicating that the new web page was loaded from the particular website that originally set the client-side variable, then the pop-up window is unloaded without ever being displayed to the user. However, if the value has not changed since the hidden pop-up window was loaded, then the pop-up window is displayed to the user at operation 74. In this case, because loading the new web page into the web browser did not also trigger a change in the value of the client-side variable, the new web page must not have been from the website that originally set the value of the client-side variable. Therefore, according to the method 60, it is assumed that the user has left the original website.

For one embodiment of the present invention, a second client-side variable tracks the number of pop-up windows actually displayed to the user. For example, when a pop-up window is displayed to the user, the value of the second client-side variable is incremented by one. A pop-up window can then be programmed to check the value of the second client-side variable to determine how many times a pop-up window has been displayed. If the value of the second client-side variable exceeds some predetermined threshold number then the pop-up window can be unloaded rather than displayed to the user. The second client-side variable (not shown) may be stored and modified in a manner similar to the above-described time client-side variable, and the predetermined special number may similarly be stored on the client-side. In an alternative embodiment, the value of the second client-side variable is checked prior to loading the hidden pop-up window. If the value of the second client-side variable exceeds some predetermined threshold number, then the pop-up window is never loaded.

Figure 6:
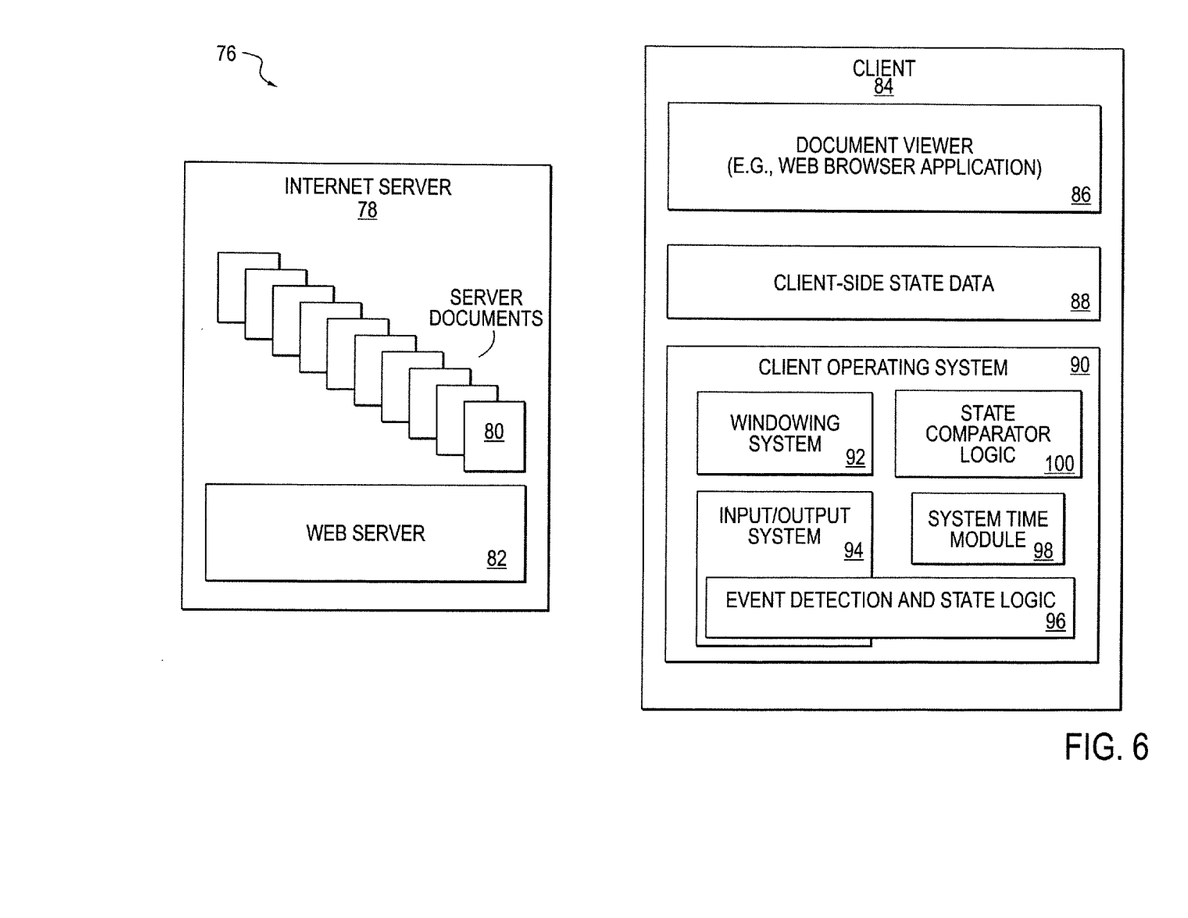
FIG. 6 illustrates an embodiment of a system to display a pop-up window when a user leaves a website.

FIG. 6 illustrates an embodiment of a system to display a pop-up window when a user leaves a website. The system 76 illustrated in FIG. 6 includes both client 84 and server 78 components. For example, the system 76 includes Internet server 78 with server documents 80 and web server 82. In addition, the system 76 includes a client component 84. The client 84 includes a document viewer 86 (e.g., a web browser), client-side state data 88, an operating system 90 with a windowing system 92, an input/output system 94, an event detection and state logic 96, a system time module 98, and a state comparator logic 100.

For one embodiment of the invention, the event detection and state logic 96 detects events, such as the loading and unloading of server documents 80 into a web browser 86, and sets a client-side variable 88 representing the state of the system based on the events detected. For example, the event detection and state logic 78 may set a client-side variable upon detection of a web-browser interaction with a particular website. A web browser interaction may include, but is not limited to, the unloading and loading of web documents 80 in a web browser 86 executing in a window of a windowing system 92.

For one embodiment of the invention, the state comparator logic 100 compares the client-side state data 88 of the system 76 at different times to determine whether a user has left a particular website. For example, the state comparator logic 80 may compare the value of a client-side variable that can only be modified by a particular web server 82 or Internet server 78. For one embodiment, the client-side variable may be set with an arbitrary value, such as a character sequence or a number. However, more intelligent determinations can be made about the user's web browsing activity if the client-side value is a timestamp, and is set with the current time each time a qualifying event occurs. For example, the state comparator logic 100 may check the value of the client-side state variable at two different times to determine whether the value has changed. If the variable is a timestamp, the state comparator logic 100 can determine the amount of time that has gone by between the unloading of a web page and the loading of another web page from the same website.

The windowing system 92 includes window loading logic to control the loading and unloading, as well as the hiding and displaying, of pop-up windows. Accordingly, the windowing system 92 may cause a previously loaded, but hidden, pop-up window to be displayed if the state comparator logic 100 determines the value of the client-side variable has not changed. For one embodiment of the invention, when the state comparator logic 100 does not detect a change in the client-side variable after a particular event has been detected (e.g., a web document unloaded), then a previously loaded, but hidden pop-up window is displayed. Similarly, for one embodiment, if a change is detected in the client-side variable, a previously loaded, but hidden pop-up window is unloaded without ever being displayed. In alternative embodiments, events other than the loading and unloading of web documents may trigger the display of a previously loaded, but hidden, pop-up window. For example, other events may trigger a change in the client-side variable indicating that the user has loaded a new web document from the same website and accordingly, has not left the website.

Figure 7:
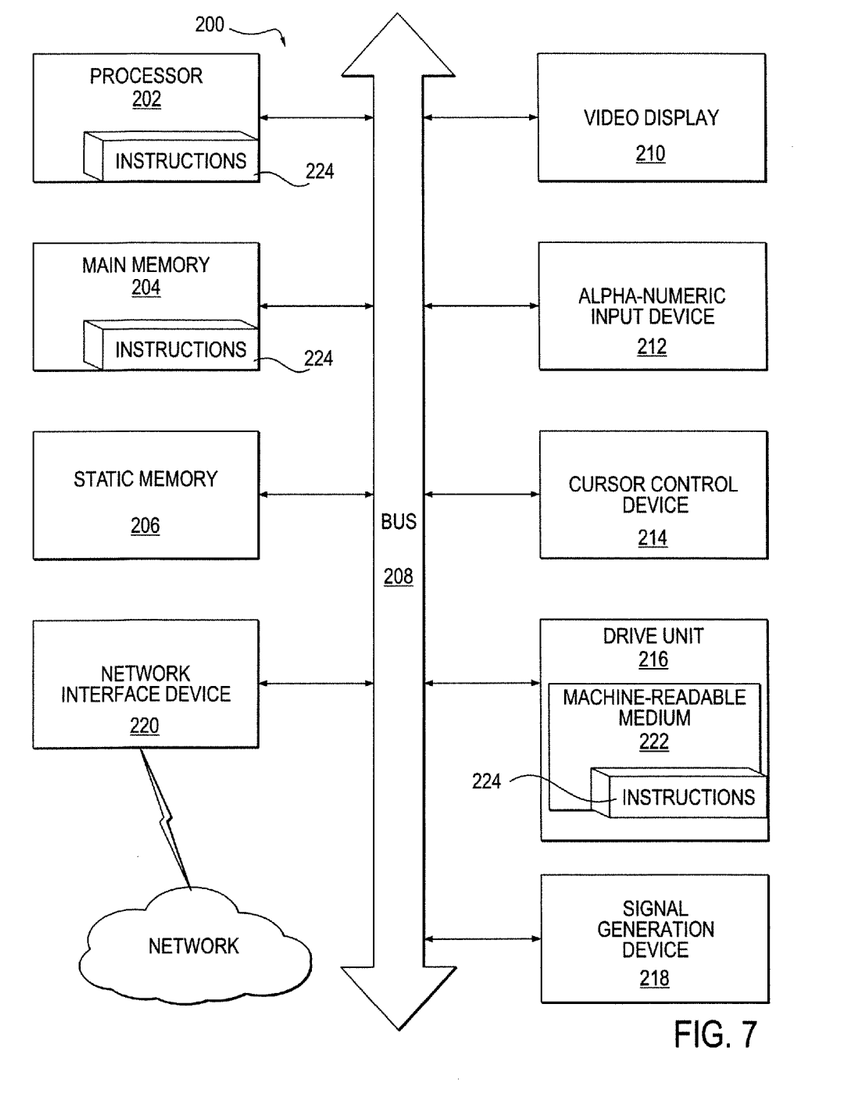
FIG. 7 shows a diagrammatic representation of a machine in the exemplary form of a computer system within which a set of instructions, for causing the machine to perform any one of the methodologies discussed above, may be executed.

FIG. 7 shows a diagrammatic representation of a machine in the exemplary form of a computer system 200 within which a set of instructions, for causing the machine to perform any one of the methodologies discussed above, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or cathode ray tube (CRT)). The computer system 200 also includes an alphanumeric input device 212 (e.g. a keyboard), a cursor control device 214 (e.g. a mouse) a disk drive unit 216, a signal generation device 218 (e.g. a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium"

shall accordingly be taken to include, but not be limited to; solid-state memories, optical and magnetic disks, and carriers wave signals.

Thus, a method and system to display a pop-up window when a user leaves a website are disclosed. It will be evident that various modifications and changes may be made to these embodiments without departing from the broader spirit and scope of the invention. Accordingly, the specification and drawings are to be regarded in an illustrative rather than a restrictive sense. For example, the invention may also be applied in a peer-to-peer computing environment.

What is claimed is:

1. A method comprising:
   setting a client-side variable with an initial value responsive to a client application loading data from a first server;
   loading, but not displaying, a pop-up notification in response to the data being unloaded from the client application;
   maintaining the initial value of the client-side variable based on the client application performing an interaction with a second server; and
   selectively displaying, one or more processors, the pop-up notification on a display based on a current value of the client-side variable.

2. The method of claim 1, wherein the selectively displaying the pop-up notification on the display is responsive to determining that the current value of the client-side variable is the same as the initial value at a predetermined time after loading the data from the first server.

3. The method of claim 1, wherein the selectively displaying the pop-up notification on the display is responsive to determining that the current value of the client-side variable is the same as the initial value after the client application performs the interaction with the second server.

4. The method of claim 1, wherein the interaction with the second server includes unloading a web page from a website hosted by the first server and loading a web page from a website hosted by the second server.

5. The method of claim 4, wherein the unloading the web page includes receiving a new URL into an address bar of the client application.

6. The method of claim 1, wherein the selectively displaying the pop-up notification is responsive to determining that the client application has been closed.

7. The method of claim 1, further comprising:
   allocating a first value of the client-side variable based on the client application performing an interaction with the first server.

8. The method of claim 7, wherein the interaction with the first server includes loading a web page from a website hosted by the first server.

9. The method of claim 7, further comprising:
   unloading the pop-up notification based on determining that the current value of the client-side variable is equal to the first value and is not the same as the initial value at a predetermined time after loading the data from the first server.

10. The method of claim 1, wherein the initial value of the client-side variable is a time stamp received responsive to the client application loading data from the first server.

11. The method of claim 10, wherein the selectively displaying the pop-up notification on the display is responsive to determining that the initial value of the client-side variable has not changed at a predetermined time after receiving the time stamp.

12. The method of claim 10, wherein the selectively displaying the pop-up notification on the display is responsive to determining that the initial value of the client-side variable has not changed after the client application performs the interaction with the second server.

13. A system comprising:
   one or more processors to execute:
   an event detection logic, the event detection logic configured to set a client-side variable with an initial value responsive to an identification of a client application that loads data from a first server and to maintain the initial value of the client-side variable in the event that the client-application performs an interaction with a second server; and
   a windowing system configured to load, but not display, a pop-up notification in response to data being unloaded from the client application and to selectively display the pop-up notification on a display based on a current value of the client-side variable.

14. The system of claim 13, further comprising:
   a state comparator logic configured to determine that the current value of the client-side variable is the same as the initial value of the client-side variable which indicates that the client application has not performed a further interaction with the first server.

15. The system of claim 14, wherein
   the state comparator logic is further configured to determine that the current value of the client-side variable is the same as the initial value of the client-side variable at a predetermined time after loading the data from the first server; and wherein
   the windowing system is further configured to selectively display the pop-up notification in response to the determination made by the state comparator logic.

16. The system of claim 14, wherein
   the state comparator logic is further configured to determine that the current value of the client-side variable is the same as the initial value of the client-side variable after the client application performs the interaction with the second server; and wherein
   the windowing system is further configured to selectively display the pop-up notification in response to the determination made by the state comparator logic.

17. The system of claim 14, wherein
   the state comparator logic is further configured to determine that the current value of the client-side variable is not the same as the initial value at a predetermined time after loading the data from the first server; and wherein
   the windowing system is further configured to unload the pop-up notification based on the determination made by the state comparator logic.

18. The system of claim 14, wherein the initial value of the client-side variable corresponds to a time stamp issued responsive to the client application loading data from the first server.

19. The system of claim 18, wherein
   the state comparator logic is further configured to determine that the current value of the client side-variable is the same as the time stamp issued responsive to the client application loading data from the first server; and wherein
   the windowing system is further configured to selectively display the pop-up notification responsive to the determination made by the state comparator logic.

20. A non-transitory machine-readable medium storing instructions which, when executed by a machine, cause the machine to perform operations comprising:

setting a client-side variable with an initial value responsive to a client application loading data from a first server;

loading, but not displaying, a pop-up notification in response to the data being unloaded from the client application;

maintaining the initial value of the client-side variable based on the client application performing an interaction with a second server;

selectively displaying the pop-up notification on a display based on a current value of the client-side variable.

* * * * *